(12) United States Patent
Tanimoto

(10) Patent No.: US 11,556,086 B2
(45) Date of Patent: Jan. 17, 2023

(54) IMAGE FORMING APPARATUS AND SETTING FILE MANAGEMENT SYSTEM

(71) Applicant: Brother Kogyo Kabushiki Kaisha, Nagoya (JP)

(72) Inventor: Satoshi Tanimoto, Nagoya (JP)

(73) Assignee: Brother Kogyo Kabushiki Kaishi, Nagoya (JP)

( * ) Notice: Subject to any disclaimer, the term of this patent is extended or adjusted under 35 U.S.C. 154(b) by 22 days.

(21) Appl. No.: 17/190,775

(22) Filed: Mar. 3, 2021

(65) Prior Publication Data

US 2021/0302887 A1 Sep. 30, 2021

(30) Foreign Application Priority Data

Mar. 31, 2020 (JP) .............................. JP2020-063641

(51) Int. Cl.
*G03G 15/00* (2006.01)
*H04N 1/00* (2006.01)
*H04N 1/32* (2006.01)

(52) U.S. Cl.
CPC ..... *G03G 15/5075* (2013.01); *H04N 1/00204* (2013.01); *H04N 1/32101* (2013.01); *G03G 2215/00109* (2013.01); *H04N 2201/3215* (2013.01); *H04N 2201/3278* (2013.01)

(58) Field of Classification Search
CPC .................................................. G03G 15/5075
USPC ........................................................ 358/1.15
See application file for complete search history.

(56) References Cited

U.S. PATENT DOCUMENTS

| 2012/0117113 | A1* | 5/2012 | Fujisawa | ............. G06F 16/1734 707/771 |
| 2012/0127525 | A1 | 5/2012 | Uchibori et al. | |
| 2013/0215458 | A1* | 8/2013 | Machida | ............ H04N 1/00344 358/1.15 |

FOREIGN PATENT DOCUMENTS

| JP | 2008-072318 A | 3/2008 |
| JP | 2012-114567 A | 6/2012 |

* cited by examiner

*Primary Examiner* — Jacky X Zheng
(74) *Attorney, Agent, or Firm* — Burr & Brown, PLLC

(57) ABSTRACT

The image forming apparatus according to the present disclosures is configured to transmit, to a file server, an acquisition request for an updating data file at a time different from an access time, which is indicated by access time information of a setting file, by a particular time and update a content of the setting file by the acquired updating data file.

13 Claims, 12 Drawing Sheets

<SETTING FILE> FC

| VARIOUS FUNCTIONS | GENERAL SETTING | | · · · · · · · · · · |
|---|---|---|---|
| | SCAN SETTING | | · · · · · · · · · · |
| | COPY SETTING | | · · · · · · · · · · |
| | PRINT SETTING | | · · · · · · · · · · |
| | COMMUNICATION SETTING | | · · · · · · · · · · |
| | SHORTCUT SETTING | | · · · · · · · · · · |
| | NETWORK SETTING | | · · · · · · · · · · |
| ADMINISTRATOR | ADMINISTRATOR PASSWORD | | ******** |
| SETTING UPDATE PROCESS | TIMING SETTINGS | FREQUENCY | EVERY DAY + WHEN POWER ON |
| | | TIME | 7:00 |
| | ACCESS SETTINGS | TYPE | CIFS |
| | | PATH | \\xxx.yyy.zzz.aaa\data\ |
| | | FILE NAME | setting.zip |
| | | AUTHENTICATION TYPE | NTLMv2 |
| | | ACCOUNT | xxxxxxx |
| | | PASSWORD | ******** |

FIG. 3

<VERSION INFORMATION RECORD>　　　　　　　　　　FV

| FILE NAME OF APPLIED UPDATE DATA FILE | setting.zip |
|---|---|
| UPDATE DATE AND TIME OF APPLIED UPDATE DATA FILE | 2/21/2020 10:00 |

FIG. 4A

<EXECUTION RESULT RECORD>　　　　　　　　　　FE

| LATEST UPDATE DATE AND TIME | 2/22/2020 7:01 |
|---|---|
| LATEST ACCESS DATE AND TIME | 2/22/2020 7:01 |
| LATEST ACCESS RESULT | SETTING SUCCESS |

FIG. 4B

<DELAY TIME RECORD>　　　　　　　　　　FD

| DELAY TIME | 60 SECONDS |
|---|---|

FIG. 4C

<LOG FILE: (FILE NAME: BRN3C2xxxxxx.csv)>

| NUMBER | FINAL ACCESS DATE | FINAL UPDATE DATE | VERSION | FINAL ACCESS RESULT |
|---|---|---|---|---|
| 1 | 2/15/2020 7:02 | 2/15/2020 7:02 | setting.zip 2/14/2020 18:00 | SETTING SUCCESS |
| 2 | 2/16/2020 7:01 | 2/15/2020 7:02 | setting.zip 2/14/2020 18:00 | NOT REFLECTED BECAUSE OF THE SAME FILE |
| 3 | 2/17/2020 7:02 | 2/15/2020 7:02 | setting.zip 2/14/2020 18:00 | NOT REFLECTED BECAUSE OF THE SAME FILE |
| 4 | 2/18/2020 7:03 | 2/15/2020 7:02 | setting.zip 2/14/2020 18:00 | NOT REFLECTED BECAUSE OF THE SAME FILE |
| 5 | 2/19/2020 7:02 | 2/15/2020 7:02 | setting.zip 2/14/2020 18:00 | NOT REFLECTED BECAUSE OF THE SAME FILE |
| 6 | 2/20/2020 7:01 | 2/15/2020 7:02 | setting.zip 2/14/2020 18:00 | NOT REFLECTED BECAUSE OF THE SAME FILE |
| 7 | 2/21/2020 7:02 | 2/15/2020 7:02 | setting.zip 2/14/2020 18:00 | NOT REFLECTED BECAUSE OF THE SAME FILE |
| 8 | 2/22/2020 7:01 | 2/22/2020 7:01 | setting.zip 2/21/2020 10:00 | SETTING SUCCESS |

FIG. 8

IMAGE FORMING APPARATUS AND SETTING FILE MANAGEMENT SYSTEM

This application claims priority under 35 U.S.C. § 119 from Japanese Patent Application No. 2020-063641 filed on Mar. 31, 2020. The entire subject matter of the application is incorporated herein by reference.

BACKGROUND

Technical Field

The present disclosures relate to an image forming apparatus and a setting file management system including the image forming apparatus.

Related Art

Conventionally, there is known a system in which an image forming apparatus included therein is controlled to operate according to setting information. In such a system, when the information processing apparatus transmits an acquisition request for setting information to a server, the server transmits the setting information to the image forming apparatus in response. Then, the image forming apparatus registers the received setting information with itself, thereby the image forming apparatus being controlled according to the setting information.

SUMMARY

In the conventional configuration, when the server stores setting information including acquisition date and time when the acquisition request is to be transmitted from the image forming apparatus to the server and multiple image forming apparatuses are connected to the server, each of the multiple image forming apparatuses registers the same setting information with itself (i.e., each of the multiple image forming apparatuses updates the setting information with the setting information received from the server). With this configuration, since the multiple image forming apparatuses transmit the acquisition requests to the server simultaneously, at the same acquisition date and time included in the registered setting information, there is a possibility that connection to the server from a part or all of the multiple image forming apparatuses would fail.

According to aspects of the present disclosure, there is provided an image forming apparatus including an image forming unit configured to form an image on a recording medium, a storage configured to store setting data, a network connector configured to connect to a file server, which stores updating data used to update a content of the setting data, through a network, and a controller configured to control the image forming unit based on the content of the setting data. The setting data contains access time information about an access time when the image forming apparatus is to access the updating data stored in the file server. The controller is configured to perform an update process including transmit, through the network connector, an acquisition request for the updating data to the file server based on the access time indicated by the access time information, acquire, through the network connector, the updating data transmitted from the file server in response to the acquisition request, and update the content of the setting file based on the updating data. In the update process, the controller transmits the acquisition request to the file server at a time different from the access time represented by the access time information by a particular time.

According to aspects of the present disclosure, there is provided a setting file management system including a file server configured to store an updating data used to update a content of setting data, and an image forming apparatus including an image forming unit configured to form an image on a recording medium, a storage configured to store the setting data, a network connector configured to connect to the file server through a network, and a controller configured to control the image forming unit based on the content of the setting data. The setting data contains access time information indicating an access time when the image forming apparatus is to access the updating data stored in the file server. The image forming apparatus transmits, through the network connector, an acquisition request for the updating data to the file server based on the access time indicated by the access time information. The file server transmits, to the image forming apparatus, the update file in response to the acquisition request. The image forming apparatus performs updating the access time by data of the updating data received from the file server, and transmitting the acquisition request to the file server at a time different from the access time indicated by the access time information by a particular time.

BRIEF DESCRIPTION OF THE ACCOMPANYING DRAWINGS

FIG. 1 schematically shows a configuration of a setting file management system including an image forming apparatus according to the first embodiment.

FIG. 3 shows contents of a setting file stored in the image forming apparatus according to the first embodiment.

FIG. 4A shows contents of a version information record stored in the image forming apparatus according to the first embodiment.

FIG. 4B shows contents of an execution result record stored in the image forming apparatus according to the first embodiment.

FIG. 4C shows contents of a delay time record stored in the image forming apparatus according to the first embodiment.

FIG. 8 is a table showing contents of a log file stored in the file server.

DETAILED DESCRIPTION OF THE EMBODIMENTS

First Embodiment

Setting File Management System

Hereinafter, illustrative embodiments according to aspects of the present disclosures will be described, referring to the accompanying drawings.

Figure 1:
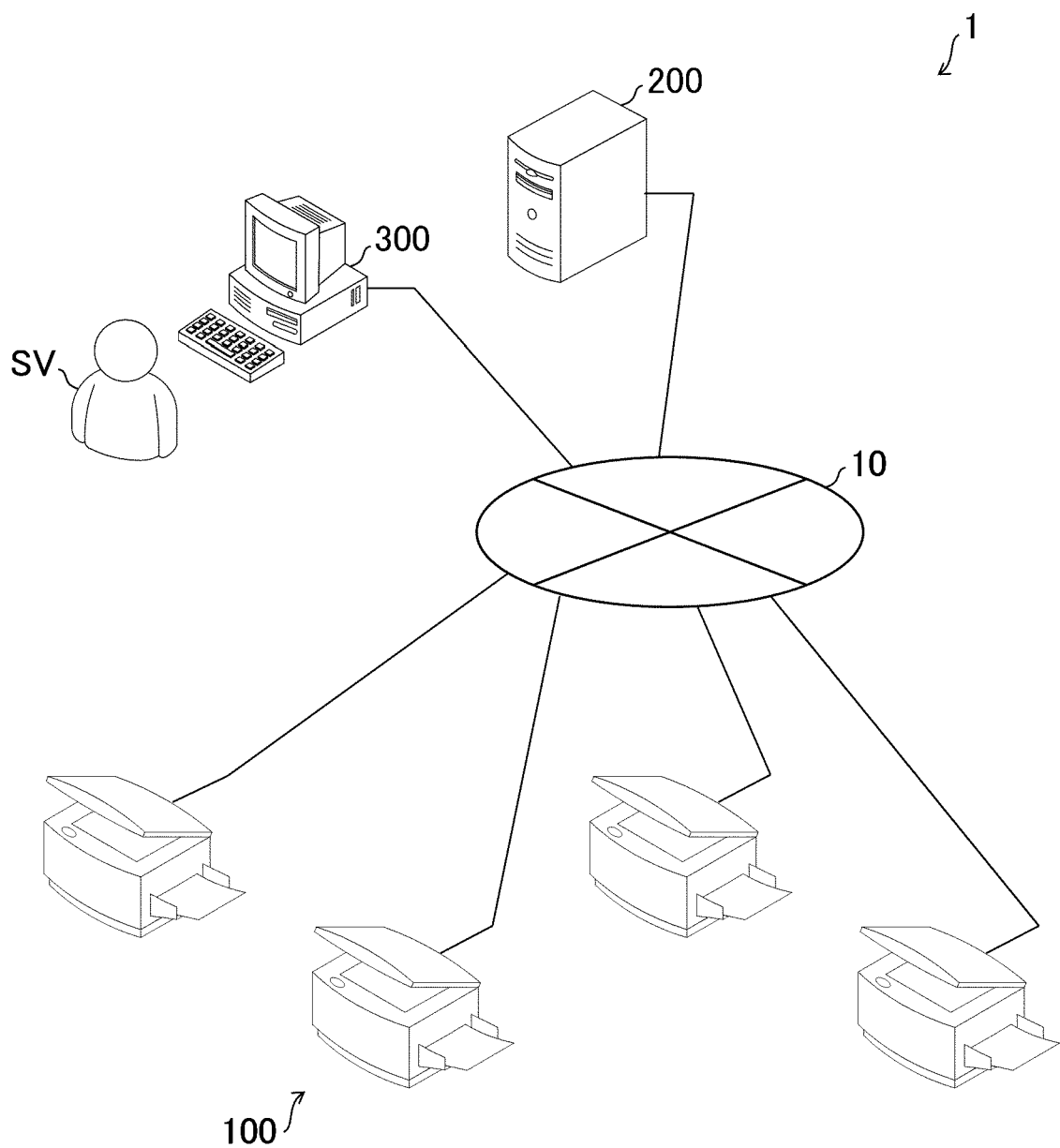

FIG. 1 schematically shows a setting file management system 1 in which an image forming apparatus 100 according to the first embodiment is included. The setting file management system 1 includes multiple image forming apparatuses 100, a file server 200 and an information processing apparatus 300 configured to be accessible to the file server 200, each of which is connected to a network 10.

Each of the multiple image forming apparatuses 100 stores setting data. In this embodiment, each of the multiple image forming apparatuses 100 stores a setting file as an example of the setting data. In each of the multiple image forming apparatuses 100, the setting file is updated by rewriting at least a part of data contained in the setting file to data contained in an updating data file. An administrator SV of the setting file management system 1 causes the file server 200 to store the updating data file in the file server 200 by operating the information processing apparatus 300. The updating data file is an example of updating data.

In the setting file management system 1, each of the multiple image forming apparatuses 100 is configured to access the file server 200 by referring to the setting file and acquire the latest updating data file. Thus, in each of the multiple image forming apparatuses 100, the setting file is automatically updated as the updating data file is applied. In the following description, operations of such an image forming apparatus 100 will be described.

Image Forming Apparatus

The image forming apparatus 100 (i.e., each of the multiple image forming apparatuses 100) is an apparatus configured to form and fix an image on a recording medium. Typically, the recording medium is a sheet-type medium. For example, the image forming apparatus 100 is a well-known electrophotographic printer, but another type of an image forming apparatus such as an inkjet type image forming apparatus may be employed.

Figure 2:
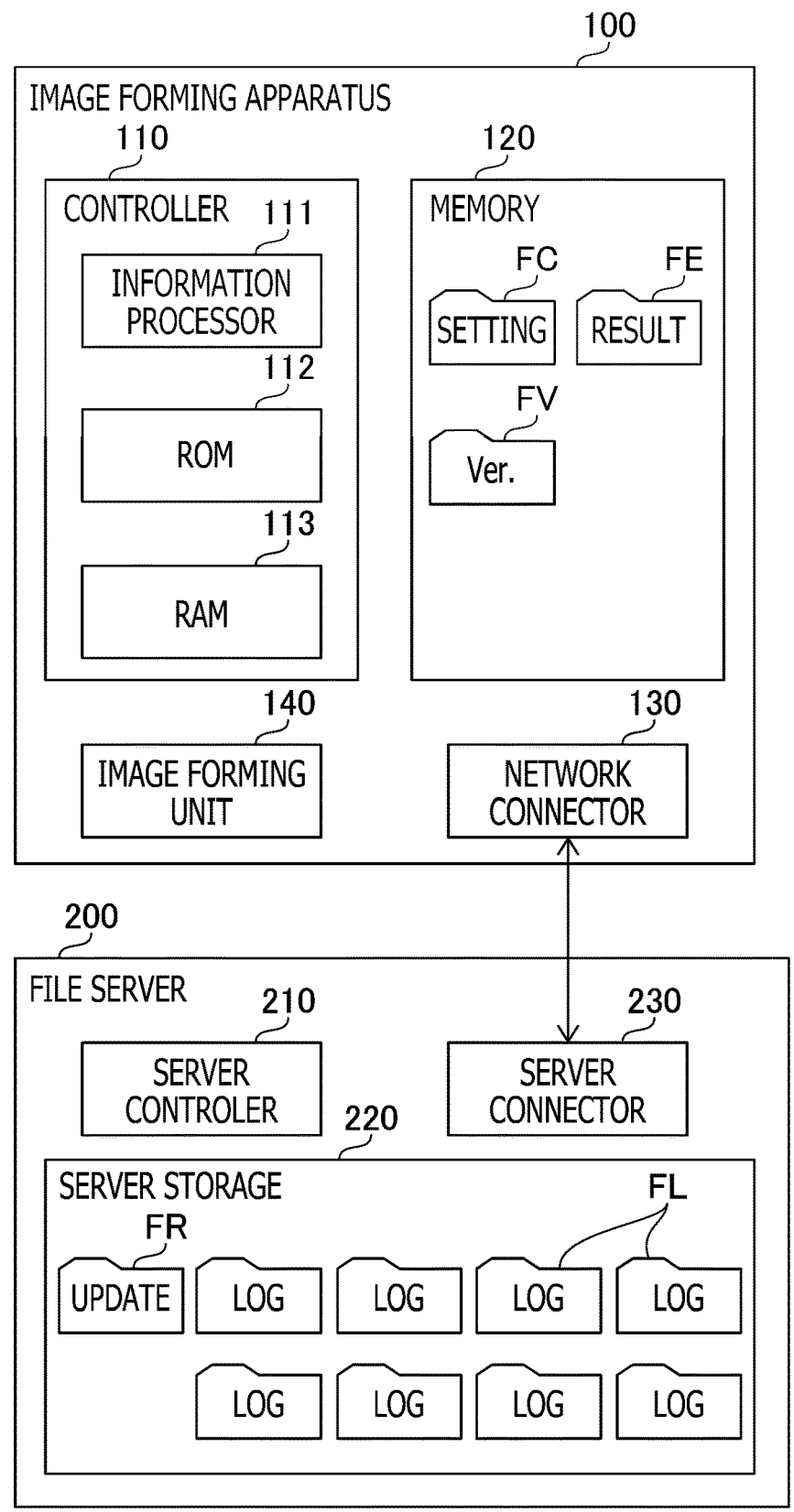
FIG. 2 is a block diagram indicating schematic configurations of the image forming apparatus and a file server according to the first embodiment.

FIG. 2 is a block diagram schematically showing configurations of the image forming apparatus 100 and the file server 200. The image forming apparatus 100 includes a controller 110, a storage 120, a network connector 130 and an image forming unit 140. The image forming unit 140 is a well-known unit configured to form and fix an image on the recording medium.

The controller 110 is a functional block configured to control the image forming unit 140 in accordance with a print instruction, which is input from an external device through the network connector 130, and form and fix a desired image on the recording medium. As shown in FIG. 2, the controller 110 includes an information processor 111, a ROM (Read Only Memory) 112, and a RAM (Random Access Memory) 113. The information processor 111 is a functional unit configured to perform processing information.

The information processor 111 includes ICs (Integrated Circuits) such as an ASIC (Application Specific Integrated Circuit), a microprocessor, a CPU, or the like. The ROM 112 stores programs executable by the information processor 111 to realize various required functions of the image forming apparatus 100. The RAM 113 is a memory in which programs and data are temporarily developed when the information processor 111 realizes respective function.

The storage 120 is a non-volatile memory. The storage 120 may include an IC (Integrated Circuit) such as an EEPROM® (Electrically Erasable Programmable Read Only Memory). The image forming apparatus 100 according to the first embodiment is configured to store a setting file FC, an execution result record FE and a version information record FV in the storage 120.

The network connector 130 is a communication interface to be used when the image forming apparatus 100 is connected to an external device through the network 10. In the setting file management system 1, the image forming apparatus 100 is configured to be communicable with the file server 200.

Setting File

The controller 110 is configured to refer to the setting file FC stored in the storage 120 when controlling the network connector 130 or the image forming unit 140 to realize a required operation of the image forming apparatus 100. The setting file FC includes information regarding parameters, reference data and default data necessary for realizing such an operation.

FIG. 3 indicates an example of various information, which may be contained in the setting file FC, illustrated in a table form. In the image forming apparatus 100 according to the first embodiment, the setting file FC includes information necessary for executing a setting update process of updating the setting file FC. Access frequency information (e.g., "FREQUENCY" of "TIMING SETTING") and access time information (e.g., "TIME" of "TIMING SETTING"), which indicate an execution frequency and an execution time of the setting update process, are examples of the information contained in the setting file FC.

In the specific example shown in FIG. 3, the access frequency information is set to "EVERY DAY+WHEN POWER ON." The setting update process is started when the image forming apparatus 100 has been powered on. When a powered-on state is kept, the setting update process is executed every day at the time indicated by the access time information. Other examples of the access frequency information may be "EVERY DAY," "WHEN POWERED ON," "MONDAY, WEDNESDAY, FRIDAY+WHEN POWERED ON" or the like.

Further, the setting file FC contains, as information necessary for the setting update process, information regarding a particular path of the file server 200 (e.g., a particular folder in the file server 200) or information regarding access to a particular file. In the concrete example shown in FIG. 3, information regarding "TYPE" indicates a type of the file server 200. Information regarding "PATH" indicates a path of the file server 200 to the updating data file FR. Information regarding "FILE NAME" indicates a file name of the updating data file FR.

The information regarding "AUTHENTICATION TYPE" indicates a type of authentication for the file server 200 to authenticate access from the external device. The information regarding "ACCOUNT" and the information regarding "PASSWORD" indicate an account which is permitted to access the path of the file server 200 to the data file FR and a password therefor. Based on the above-mentioned multiple pieces of information, the controller 110 is configured to access, through the network connector 130, the updating data file FR stored in the file server 200 or the path to the updating data file FR.

The setting file FC could contain the information regarding "ADMINISTRATOR PASSWORD" necessary to execute the setting update process. Further, the setting file FC contains multiple pieces of information, exemplary items of which are shown in FIG. 3, related to operations of various functions that the image forming apparatus 100 has.

Record

The storage 120 stores a version information record VF and an execution result record FE. FIGS. 4A and 4B indicate examples of various information that these records can include illustrated in a table form.

The version information FV is a record containing information about the updating data file FR when the updating data file FR is applied by the setting update process and the setting file FC is updated recently. As indicated in FIG. 4A, the version information record FV contains file name information of the applied updating data file FR and updated date and time information about date and time when the updating data file FR was applied.

The execution result record FE is a record containing information about a result of the setting update process. As shown in FIG. 4B, the execution result record FE contains the final updated date & time information, which is the most recent execution date and time when the setting file FC is updated by applying the updating data file FR in the setting update process. Further, the execution result record FE contains final access date & time information and final access result information. The final access date & time information indicates the latest execution date and time of the setting update process. The final access result information indicates a result of the latest setting update process.

File Server

As shown in FIG. 2, the file server 200 includes a server controller 210, a server storage 220 and a server connector 230. The server connector 230 is a communication interface for the file server 200 to connect to another network terminal through the network 10. The server storage 220 is a memory for storing various files. The server controller 210 is a functional block configured to control the above-mentioned functional blocks to execute operations of the file server 200.

The file server 200 could permit storing (i.e., uploading) of a file in the server storage 220 by an external device connected to the network 10. Further, the file server 200 could permit transmission (i.e., downloading) of contents of files stored in the server storage 220 to an external device connected to the network 10.

Alternatively, the file server 200 can allow that additional information (e.g., a file name, a file created date and time, or an updated date and time) about the file stored in the server storage 220 of the file server 200 is referred to by a terminal device connected to the network 10. The file server 200 of the setting file management system 1 is a generally-known file server having such a function.

File servers having such a function are widely used in corporate networks and other networks. Therefore, the administrator SV of the setting file management system 1 can construct the setting file management system 1 using the existing file server, as it is, as the file server 200.

The server storage 220 stores the updating data file FR to a particular path (e.g., a particular folder). The updating data file FR contains data for rewriting at least a part of the contents of the setting file FC. The updating data file FR contains data for rewriting the timing setting of the setting file FC. As described above, the updating data file FR does not necessarily contain information about all the contents of the setting file FC. It is noted that the data for rewriting the timing setting is an example of time update data. The data for rewriting the timing setting is, for example, data for updating a time setting included in the setting file FC with another time setting. This "another time setting" is an example of an updated time.

Further, the server storage 220 stores a log file FL at the particular path. The log file FL is a file generated for each of the image forming apparatuses 100. In the server storage 220, the file name and the file updated date and time information are appended to each of the updating data file FR and the log file FL. It is noted that the file updated date and time is the date and time when the content for the electric file is newly created or created by modification, and then fixed and saved as the electric file.

Main Process

Figure 5:
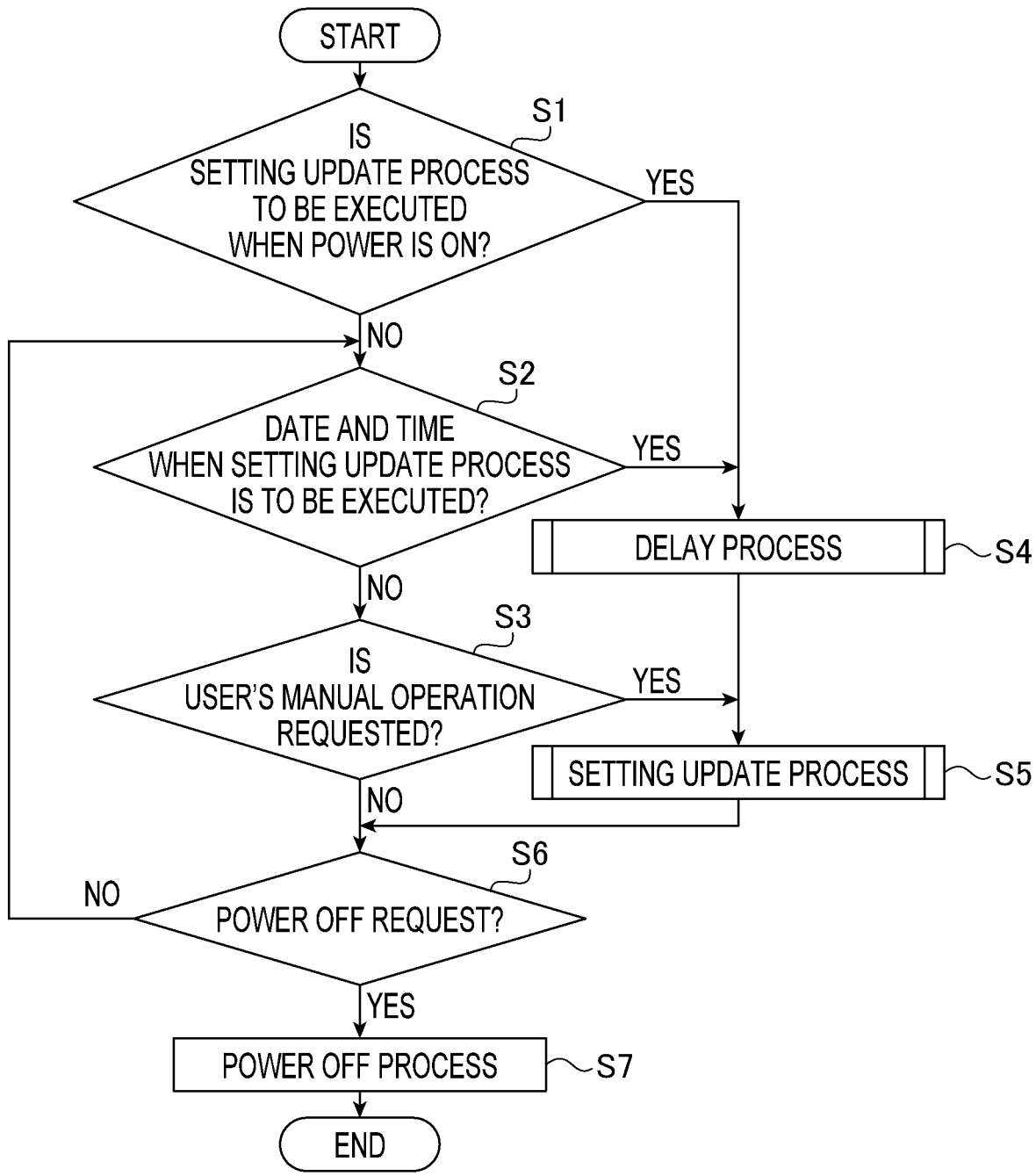
FIG. 5 shows a flowchart illustrating main operations of the image forming apparatus according to the first embodiment.

FIG. 5 is a flowchart showing the main processes which are executed by the image forming apparatus 100 when the image forming apparatus 100 is powered on.

When the image forming apparatus 100 is powered on and activated, the information processor 111 refers to the access frequency information of the setting update process in the setting file FC stored in the storage 120. Based on the access frequency information, the information processor 111 determines, in step S1, whether to execute the setting update process when the image forming apparatus 100 is powered on. When it is determined that the setting update process is to be executed when the image processing apparatus is powered on (S1: YES), the process proceeds to step S4. Otherwise (S1: NO), the process proceeds to step S2.

In step S2, the information processor 111 refers to the access frequency information and the access date & time information of the setting update process in the setting file FC stored in the storage 120. Based on the above information, the information processor 111 determines whether the current date and time are the date and time when the setting update process is to be executed. When it is determined that the current date and time are the date and time when the setting update process is to be executed (S2: YES), the process proceeds to step S4. Otherwise (S2: NO), the process proceeds to step S3.

In step S3, the information processor 111 determines whether a user requests, by a user's manual operation, the image forming apparatus 100 to execute the setting update process (i.e., whether there is an execution request for the setting update process). When it is determined that a request for execution of the setting update process has been issued (S3: YES), the process proceeds to step S5. Otherwise (S3: NO), the process proceeds to step S6.

In step S4, the image forming apparatus 100 executes a delay process. Then, the process proceeds to Step S5.

Figure 7A:
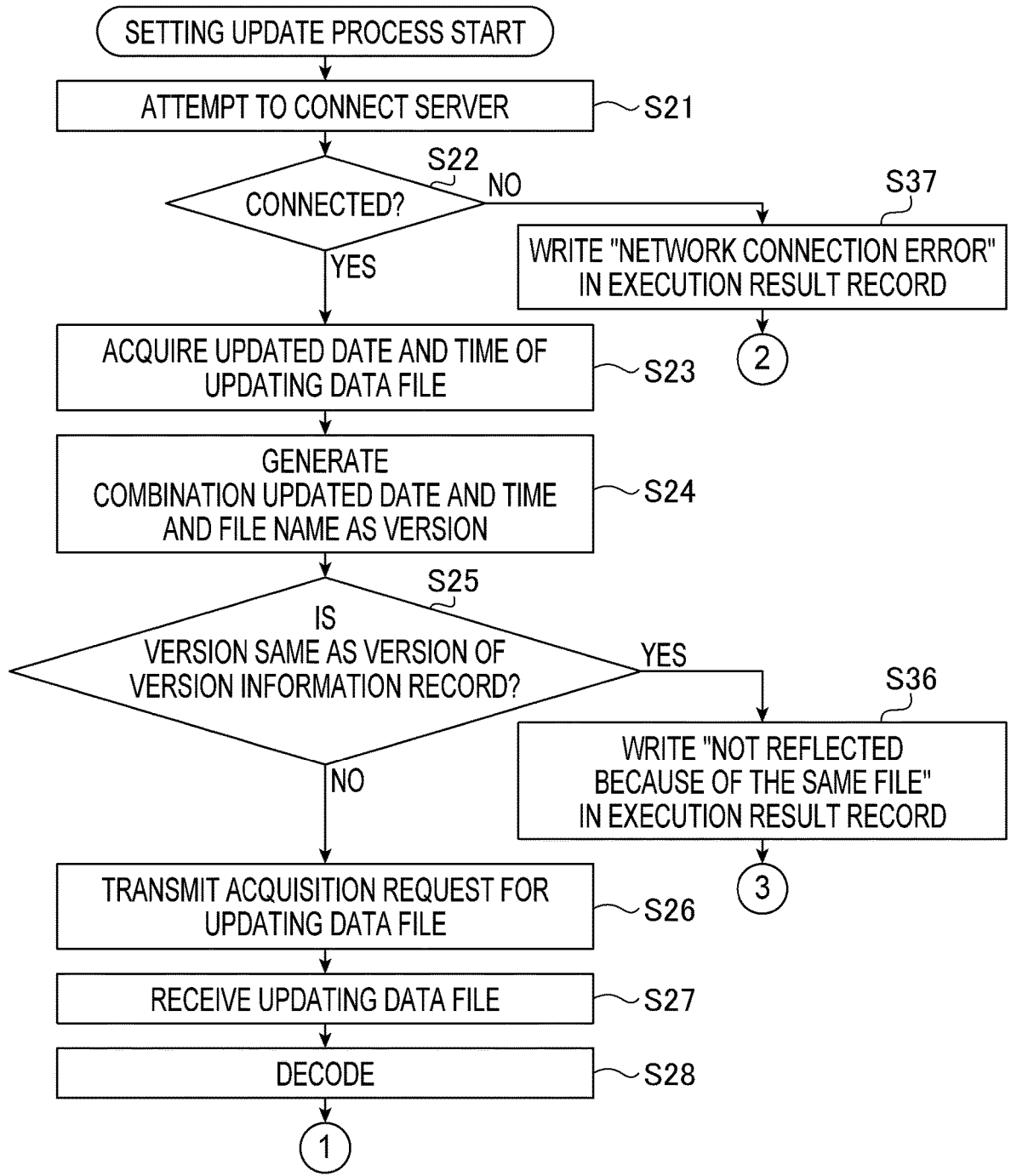
FIGS. 7A and 7B show a flowchart illustrating a setting update process according to the first embodiment.
Figure 7B:
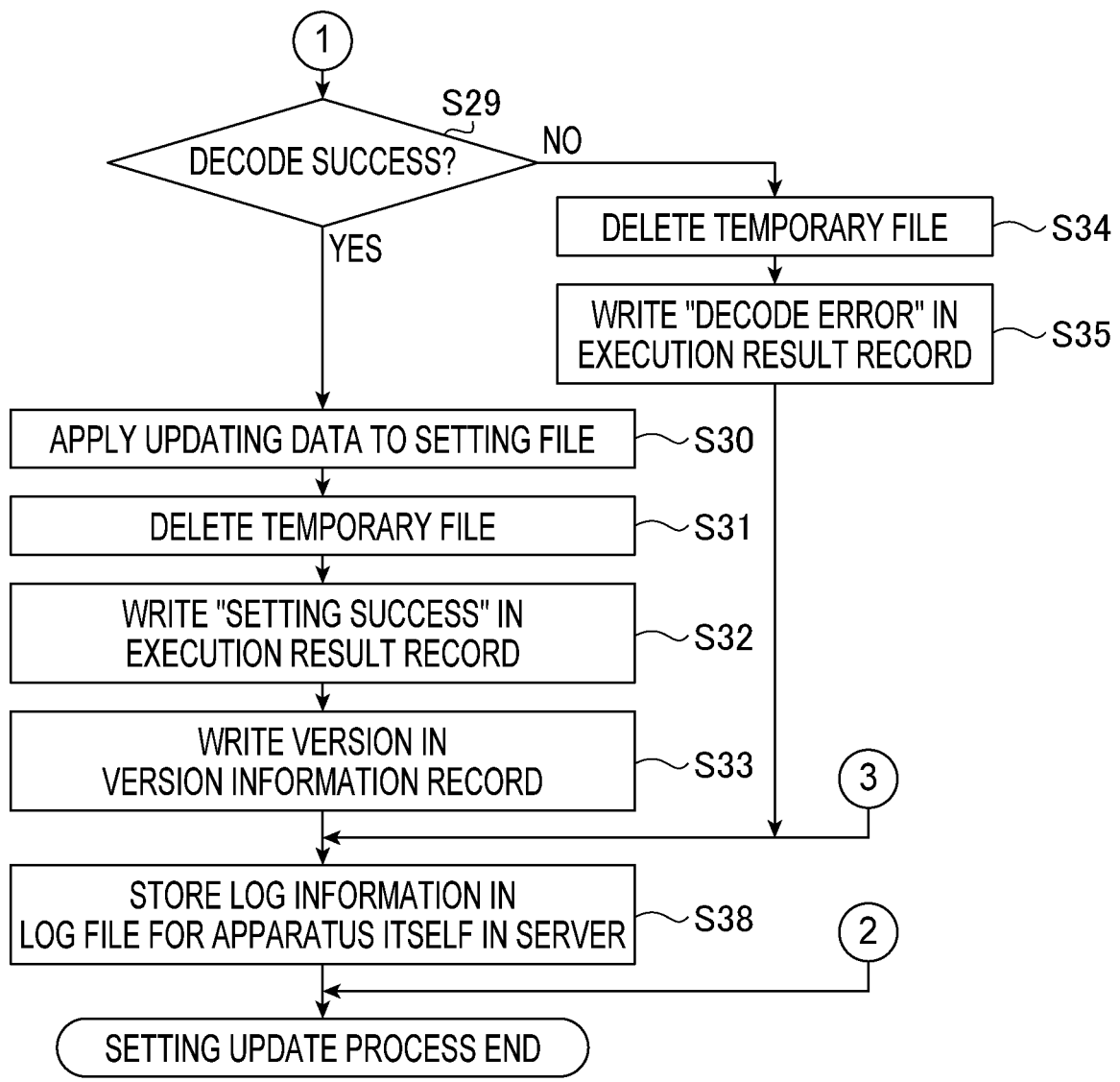

In step S5, the image forming apparatus 100 executes the setting update process. FIGS. 7A and 7B show a flowchart of the setting update process. After execution of the setting update process (S5), the process proceeds to S6.

In step S6, the information processor 111 determines whether the user requests, by a user's manual operation, to power off the image forming apparatus 100 (i.e., whether there is a power-off request). When it is determined that the power-off request has been issued (S6: YES), the process proceeds to step S7. Otherwise (S6: NO), the process returns to step S2.

In step S7, the information processor 111 executes a process to power off the image processing apparatus 100. Then, the process is terminated.

Delay Process

Figure 6:
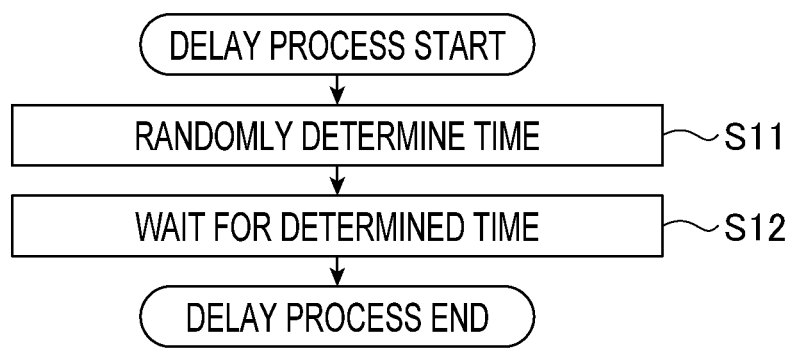
FIG. 6 is a flowchart illustrating a delay process according to the first embodiment.

FIG. 6 is a flowchart showing the delay process, which is a subroutine called in step S4 of the main process shown in FIG. 5.

The delay process is also executed before the setting update process is executed when the image processing apparatus is powered on. The delay process is executed to suppress a situation where the setting update processes are executed by many image forming apparatuses 100 simultaneously as the many image forming apparatuses 100 are powered on simultaneously, for example, at the time of recovery from a power failure or the like.

In step S11, the information processor 111 randomly determines a time to delay the time when the setting update process is executed based on a random number. Accordingly, if the system 1 includes multiple image forming apparatuses, multiple delay times, which are different from each other, may be determined by using the random numbers, and the concentration of accesses to the file server 200 can be suppressed. It is noted that the time determined in step S11 is an example of a particular time.

Subsequently, in step S12, the information processor 111 waits for the determined time. Then, the delay process is terminated, and the process returns to the main process.

Setting Update Process

FIGS. 7A and 7B show a flowchart showing the setting update process which is a subroutine called in step S5 of the main process shown in FIG. 5.

In step S21, the information processor 111 refers to the access setting information of the setting file FC stored in the storage 120, and attempts to refer to the updating data file FR stored at the particular path of the file server 200 through the network connector 130. In the example shown in FIG. 3, the particular path is "\\xxx.yyy.zzz.aaa\data\," and the file name of the updating data file FR is "setting.zip." It is noted that "xxx.yyy.zzz.aaa" indicates an IP address (Internet Protocol Address) of the file server 200 and "\data" indicates a directory in the file server 200.

Subsequently, in step S22, the information processor 111 determines whether the information processor 111 has referred to the updating data file FR stored in the file server 200. When it is determined that the information processor 111 has referred to the updating data file FR (S22: YES), the process proceeds to step S23. Otherwise (S22: NO), the process proceeds to step S37.

In step S23, the information processor 111 acquires the updated date and time information of the updating data file FR appended to the updating data file FR stored in the file server 200.

In step S24, the information processor 111 generates data referred to as "VERSION" in which the file name of the updating data file FR and the updated date and time information of the updating data file FR are combined. The "VERSION" generated in step S24 is data regarding the updating data file FR currently stored in the file server 200.

In step S25, the information processor 111 determines whether the "VERSION" generated in step S24 is the same as a "VERSION" based on data contained in the version information record FV stored in the memory 120. When it is determined that the two "VERSIONs" are the same (S25: YES), the process proceeds to step S36. Otherwise (S25: NO), the process proceeds to step S26.

In step S26, the information processor 111 transmits an acquisition request for the updating data file to the file server 200 through the network connector 130. The acquisition request is transmitted to acquire the updating data file FR of the "VERSION" different from the updating data file FR which is previously used to update the setting file FC in the image forming apparatus 100.

In step S27, the information processor 111 receives, through the network connector 130, the updating data file FR, which is transmitted from the file server 200 in response to the acquisition request, and stores it in the RAM 113.

In step S28, the information processor 111 refers to the information regarding the administrator password in the setting file FC stored in the storage 120 to decode the encoded updating data file FR and develop the decoded updating data file FR in the RAM 113.

In step S29, the information processor 111 determines whether the decoding of the updating data file FR has been successfully finished. When it is determined that the decoding has been successfully finished (S29: YES), the process proceeds to step S30. Otherwise (S29: NO), the process proceeds to step S34.

In step S30, the information processor 111 updates the contents of the setting file FC by rewriting the setting file FC using the decoded data, which is decoded data of the updating data file FR developed in the RAM 113. The information processor 111 updates the timing setting of the setting file FC using the data for rewriting the timing setting contained in the updating data file FR. It is noted that the process in step S30 is an example of a time update process.

In step S31, the information processor 111 deletes the setting file FC in the RAM 113 and the decoded data of the setting file FC since these pieces of data have been reflected in the setting file FC and are no longer necessary.

In step S32, the information processor 111 writes "SETTING SUCCESS" as the final access result information in the execution result record FE stored in the storage unit 120. Further, the information process 111 writes, in the execution result record FE, the information regarding the current date and time as the final updated date and time information, and as the final access date and time information. The above step is executed since accessing the updating data file FR in the file server 200 has been performed, and updating the setting file FC has been performed.

In step S33, the information processor 111 writes, in the version information record FV stored in the storage unit 120, the file name of the updating data file FR referred to in step S21 as the file name information of the applied updating data file FR. Further, the information processor 111 writes the updated date and time information of the updating data file FR acquired in step S23 as the updated date and time information of the applied updating data file FR. The above step S23 is executed since the setting file FC has been updated. Thereafter, the process proceeds to step S38.

When the decoding in step S28 is not successful, the process proceeds to step S34. In step S34, the information processor 111 deletes the setting file FC from the RAM 113.

In step S35, the information processor 111 writes, in the execution result record FE stored in the storage unit 120, "DECODE ERROR" as the final access result information, and information regarding the current date and time as the final access date and time information. The above process is executed since the updating data file FR of the file server 200 has been accessed. Since the setting file FC has not been updated, the final updated date and time information is not changed. Further, the version information record FV is not changed in step S35.

When the "VERSION" of the updating data file FR currently stored in the file server 200 is the same as the "VERSION" based on the data stored in the version information record FV of the storage 120, the process proceeds to this step S36.

The information processor 111 writes, in the execution result record FE of the storage 120, "NOT REFLECTED BECAUSE OF THE SAME FILE" as the final access result information, and information regarding the current date and time as the final access date and time information. The above process is performed since the updating data file FR of the file server 200 has been accessed. It is noted that, since the setting file FC has not been updated, the final updated date and time information is not changed. Further, the version information record FV is not changed. Thereafter, the process proceeds to step S38.

When the updating data file FR at the particular path of the file server 200 is not successfully referred to, the process proceeds to step S37.

The information processor 111 writes, in the execution result record FE of the storage 120, "NETWORK CONNECTION ERROR" as the final access result information, and the information of the current date and time as the final access date and time information. The above process is performed since access to the updating data file FR of the file server 200 has been attempted. It is noted that, since the setting file FC has not been updated, the final updated date and time information is not changed. Further, the version information record FV is not changed in step S37. Next, the setting update process is terminated, and the process returns to the main process.

In step S38, the information processor 111 refers to the access setting information of the setting file FC stored in the storage 120, and stores log information in the log file FL of the image forming apparatus 100 itself through the network connector 130, which log file FL is stored at the particular path of the file server 200. The log information includes an update log when the setting file FC is updated.

According to the example of the setting file FC shown in FIG. 3, the particular path is "\\xxx.yyy.zzz.aaa\data\." The filename of the log file FL of the image forming apparatus 100 itself is a name using identification information (ID) of the image forming apparatus 100 itself. When there is no log file FL of the image forming apparatus 100 itself at the particular path, the information processor 111 creates the log file FL of the image forming apparatus 100 in the particular path and writes the log information in the created log file FL.

The log information to be written includes the execution result record FE stored in the storage 120 and the information contained in the version information record FV. The log file FL will be explained later. Then, the setting update process is terminated, and the process returns to the main process.

Log File

FIG. 8 indicates an example of information which can be contained in the log file FL in tabular format. The log file FL is given a file name including the identification information (ID) of the image forming apparatus 100 which has created the log file FL.

Each line of FIG. 8 indicates a piece of log information which is written at each execution of step S38. The final access date and time information, the final updated date and time information, and the final access result information in the log file FL are those contained in the execution result record FE of the image forming apparatus 100 and written into the log file FL. The version information in the log file FL is information written based on the information contained in the version information record FV of the image forming apparatus 100.

Effects

The file server 200 of the setting file management system 1 can be a general file server using a known technique. Therefore, the administrator SV of the setting file management system 1 does not need to construct a dedicated server for managing the setting file FC of the image forming apparatus 100.

Further, since such a file server is widely used in an in-enterprise network or the like, the existing file server can be used as the file server 200 of the setting file management system 1. Therefore, a burden to the administrator SV for constructing and managing the setting file management system 1 can be reduced.

According to the first embodiment, the administrator SV can manage many image forming apparatuses 100 using only one type of setting file FC as far as the image forming apparatuses 100 are of the same model. Further, to update such a setting file FC, it is necessary to transmit only one file of the latest updating data file FR from the information processing apparatus 300 or the like to the file server 200.

Then, the image forming apparatus 100 accesses the updating data file FR stored in the file server 200 based on the information of the setting file FC, and automatically performs updating when the update information is available. Accordingly, the administrator SV does not need to create the setting file FC or the updating data file FR for each of the many image forming apparatuses 100, and can manage the many image forming apparatuses 100 easily and efficiently.

However, since the many image forming apparatuses 100 are managed based on one type of setting file FC and the execution date and time when the setting update process is performed is defined therein, the many image forming apparatuses 100 would normally access, in the setting update process, the server simultaneously. In such a case, the many image forming apparatuses 100 would fail to connect to the server. According to the first embodiment, however, the execution date and time when the setting update process is performed is randomly delayed for each image forming apparatus 100 by the delay process shown in FIG. 6. Therefore, the access concentration to the file server 200 is avoided, and the setting file FC can be securely updated for the large number of image forming apparatuses 100.

Further, the administrator SV can refer to the log files FL for respective image forming apparatuses 100, which are stored in the file server 200, through the information processing apparatus 300 or the like. Therefore, the administrator SV can check an updated status of the setting file FC for each image forming apparatus 100 without going to a place where each apparatus is installed. Thus, even when the number of image forming apparatuses 100 connected to the network 10 is large, the administrator SV can easily manage updating of the setting file FC.

According to this embodiment, before executing the setting update process shown in FIGS. 7A and 7B, the image forming apparatus 100 waits for a determined time determined in step S11 (S12). Further, when executing the main process shown in FIG. 5 after update of the time setting of the setting file FC based on the updating data file FR (S30), the image forming apparatus 100 executes the delay process (S4) at a time indicated by the updated time setting of the setting file FC. Then, the image forming apparatus 100 waits for a determined time determined in step S11 and executes the setting update process shown in FIGS. 7A and 7B. In the setting update process, a time when the information processor 111 transmits the acquisition request (S26) is an example of a transmission time.

However, the present disclosures should not be limited to this configuration. The setting update process may be executed out at a time that differs from the time set in the setting file FC by a particular amount of time. For example, the image forming apparatus 100 may execute the setting update process shown in FIGS. 7A and 7B at an earlier time than the timing set in the setting file FC by a particular time.

Second Embodiment

Hereinafter, a second embodiment according to the aspects of the present disclosures will be described. For convenience of explanation, the same reference numerals will be assigned to members having the same functions as members described in the first embodiment, and the descriptions thereof will not be repeated.

The image forming apparatus 100 according to the second embodiment has a structure same as that of the first embodiment except that the storage 120 according to the second embodiment further stores a delay time record FD. As shown in FIG. 4C, the delay time record FD contains information regarding the delay time.

Operations of Image Forming Apparatus

Operations of the image forming apparatus 100 according to the second embodiment are partially different from that of the first embodiment. A main process according to the second embodiment is the same as the main process according to the first embodiment shown in FIG. 5. In the following description, only differences with respect to the operation of the first embodiment will be explained.

Figure 9A:
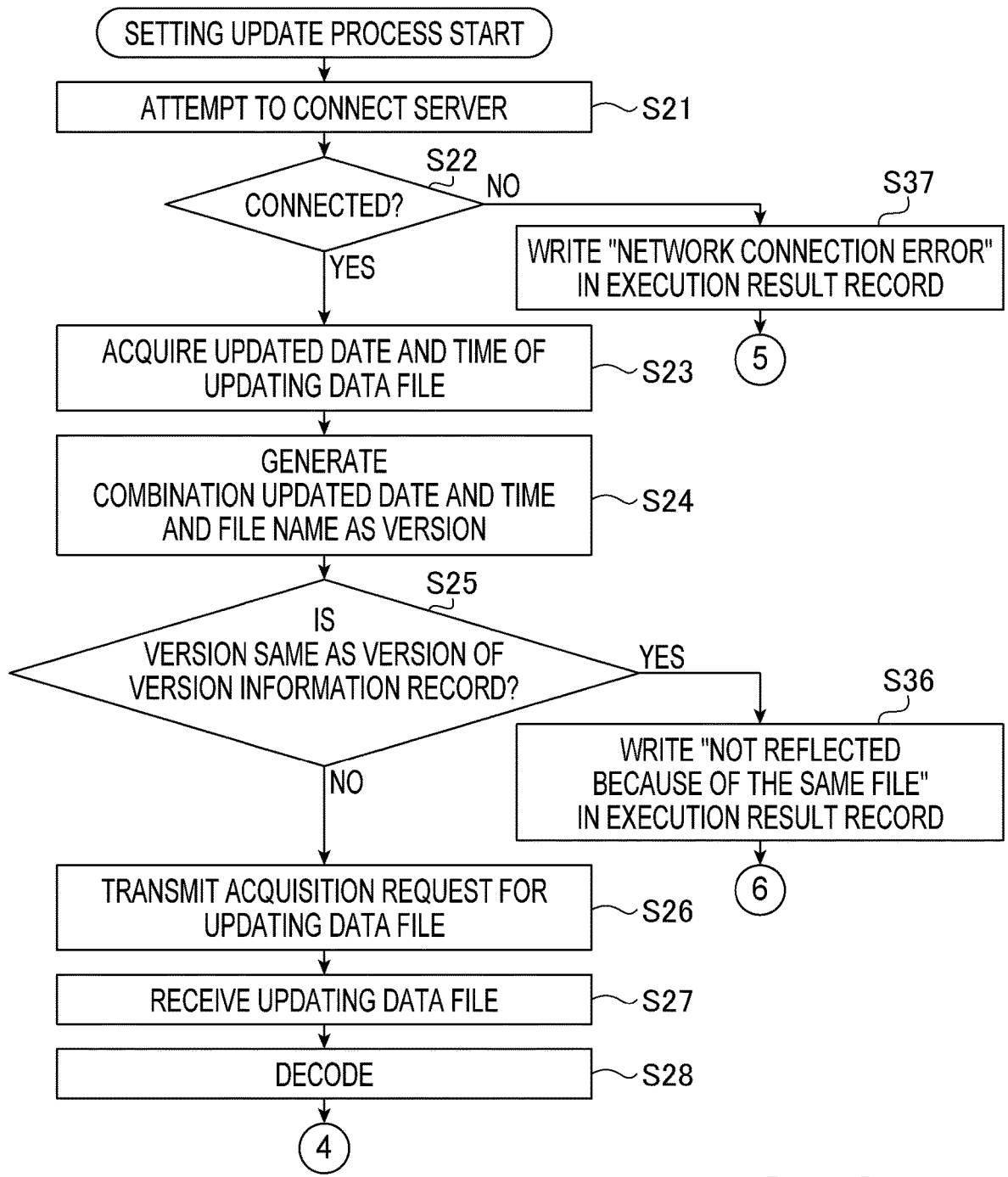
FIGS. 9A and 9B show a flowchart illustrating the setting update process according to the first embodiment.
Figure 9B:
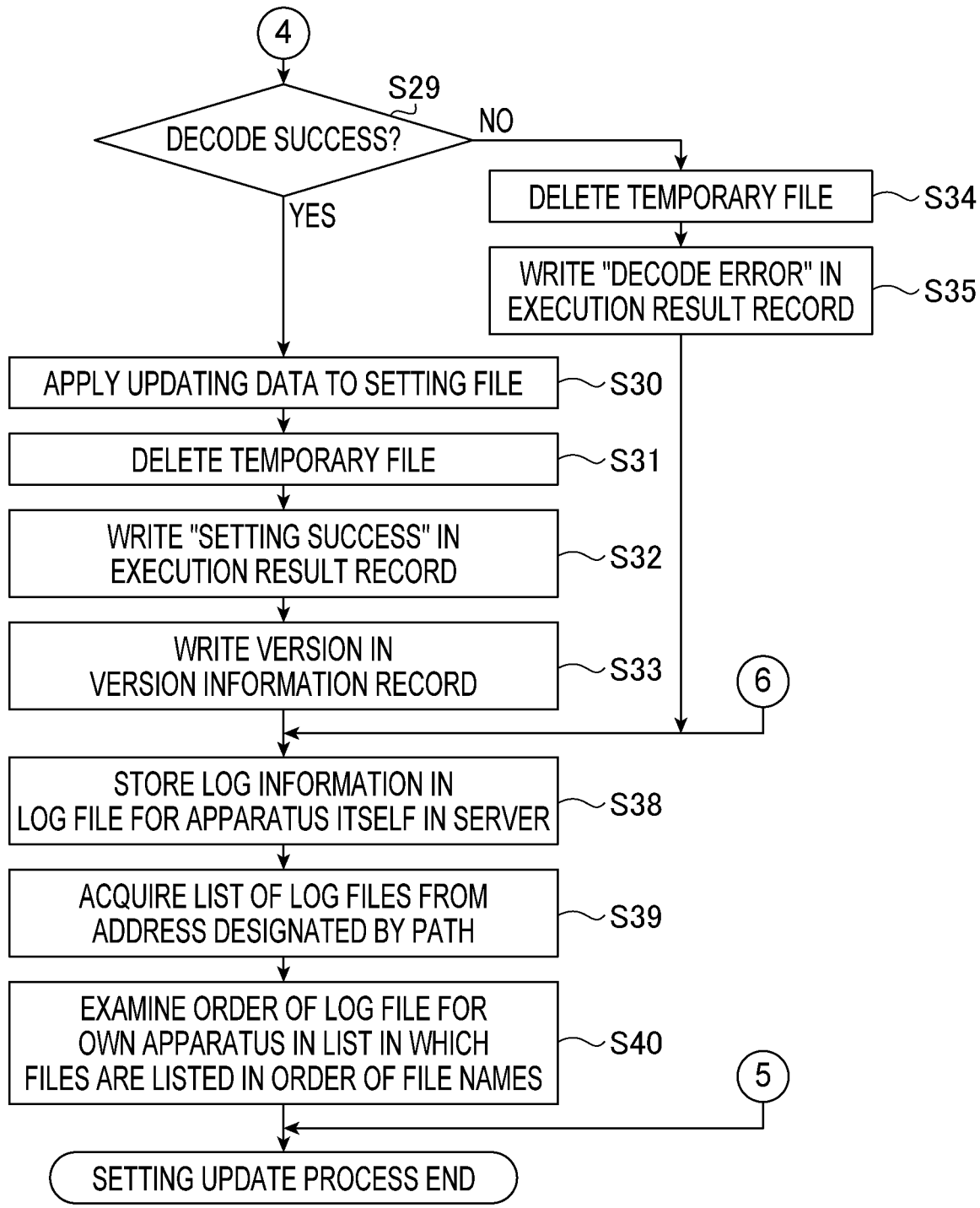

FIGS. 9A and 9B show a flowchart showing the setting update process according to the second embodiment. Compared with the setting update process according to the first embodiment shown in FIGS. 7A and 7B, the flowchart shown in FIGS. 9A and 9B are substantially the same as the flowchart shown in FIGS. 7A and 7B according to the first embodiment except that steps S39 and S40 are added after step S38.

Hereinafter, steps S38 to S40 in the setting update process according to the second embodiment will be described. In step S38, the information processor 111 refers to the access setting information of the setting file FC stored in the storage 120, and writes, through the network connector 130, log information into the log file FL for the image forming apparatus 100 itself, which is stored at the particular path of the file server 200. When there is no log file FL for the image forming apparatus 100 itself at the particular path, the information processor 111 creates the log file FL for the image forming apparatus 100 itself at the particular path and then writes the log information into the thus created log file FL.

Subsequently, in step S39, the information processor 111 acquires a list of log files FL stored at the particular path of the file server 200 through the network connector 130.

Subsequently, in step S40, the information processor 111 examines what order, in the acquired list of the log files FL, is the log file FL for the image forming apparatus 100 itself in which an identification number of the image forming apparatus 100 itself is used as a file name, in the acquired list of log files FL where the log files FL are listed in an order of file names.

Then, the information processor 111 calculates the delay time by multiplying the order by a constant time set in advance. The constant time may be 20 seconds, but may be any other suitable time. The information processor 111 writes the calculated delay time in the delay time record FD. Next, the "setting update process" ends and the flow returns to the main flow. It is noted that the process in step S40 is an example of the time update process.

Figure 10:
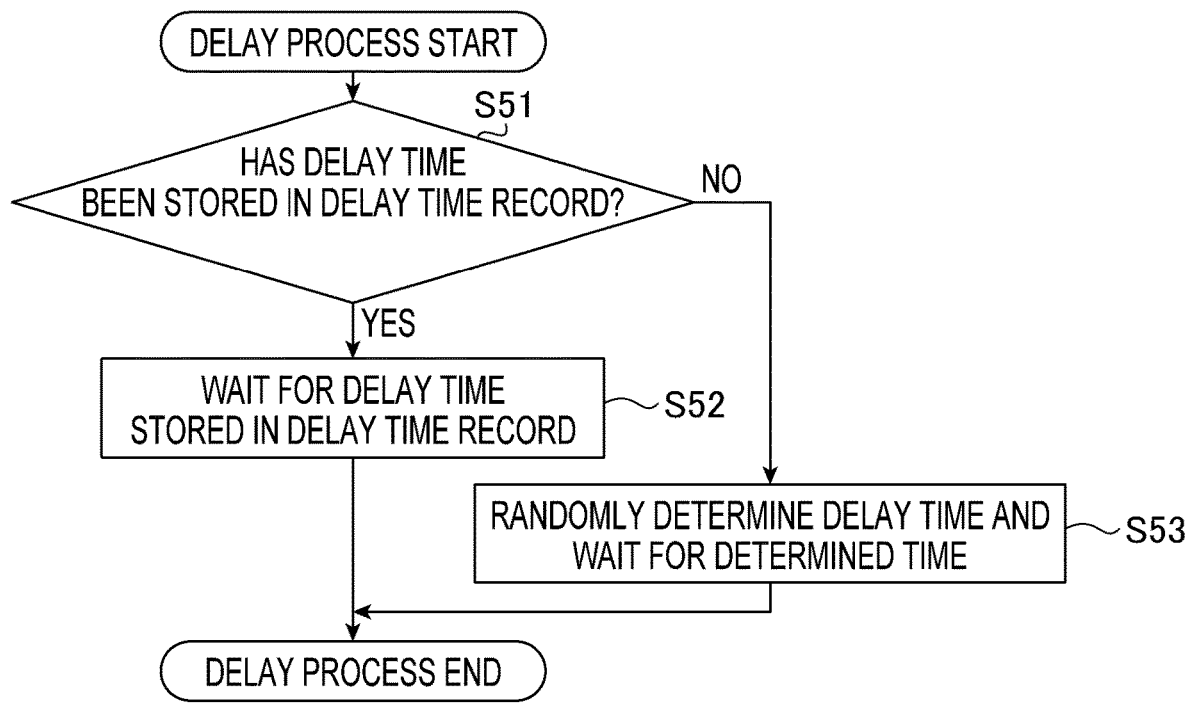
FIG. 10 shows a flowchart illustrating the delay process according to the first embodiment.

The delay process according to the second embodiment will be described below with reference to FIG. 10.

In step S51, the information processor 111 refers to the delay time record FD stored in the storage 120 and determines whether the delay time is stored therein. When it is determined that the delay time is stored (S51: YES), the process proceeds to step S52. Otherwise (S51: NO), the process proceeds to step S53.

In step S52, the information processor 111 refers to the information regarding the delay time of the delay time record FD stored in the storage 120, and waits for the amount of time. Then, the information processor 111 terminates the delay process and returns to the main process.

Since the delay time has not been determined in an initial state, the process proceeds to step S53. The information processor 111 randomly determines the delay time for delaying the time at which the setting update process is executed. Then, the information processor 111 waits for the amount of delay time as determined. Next, the information processor 111 terminates the delay process returns to the main process.

According to this embodiment, before executing the setting update process shown in FIGS. 9A and 9B, the image forming apparatus 100 waits for the delay time (S52 or S53). Further, when executing the main process shown in FIG. 5 after update of the time setting of the setting file FC based on the updating data file FR (S30), the image forming apparatus 100 executes the delay process (FIG. 10) at a time indicated by the updated time setting of the setting file FC. Then, the image forming apparatus 100 waits for the delay time and executes the setting update process shown in FIGS. 9A and 9B.

In the second embodiment, effects same as those in the first embodiment can be obtained. Further, according to the second embodiment, since different delay times are set for the multiple image forming apparatuses 100, respectively, concentration of accesses to the file server 200 are efficiently avoided, and the setting files FC for a large number of image forming apparatuses 100 can be securely updated.

Additional Notes

The present disclosures should not be limited to configurations of the above-described embodiments, but various modifications can be made within aspects of the present disclosures. Embodiments obtained by appropriately combining the disclosed configurations are also included in the aspects of the present disclosures. Furthermore, new configurations can be obtained by combining the configuration disclosed in the embodiments and modifications obtained therefrom.

What is claimed is:
1. An image forming apparatus comprising:
an image forming unit configured to form an image on a recording medium;
a storage configured to store setting data;
a network connector configured to connect to a file server, which stores updating data used to update a content of the setting data, through a network; and a controller configured to control the image forming unit based on the content of the setting data, wherein the setting data contains access time information about an access time when the image forming apparatus is to access the updating data stored in the file server, wherein the controller is configured to perform an update process including:

transmitting, through the network connector, an acquisition request for the updating data to the file server at a time based on the access time indicated by the access time information contained in the setting data;

acquiring, through the network connector, the updating data transmitted from the file server in response to the acquisition request, and updating the content of the setting data containing the access time information based on the updating data, and wherein, in the update process, the controller is configured to:

determine the time when the acquisition request is to be transmitted based on the access time information, without requiring user operation to the image forming apparatus, such that the time is different from the access time represented by the access time information by a particular time; and transmit the acquisition request to the file server at the determined time.

2. The image forming apparatus according to claim 1, wherein the updating data acquired in the update process is configured to include time update data indicating update of the access time represented by the access time information with an updated time different from the access time, and wherein the controller is configured to perform:

a time update process of updating the access time information included in the setting data based on the time update data when receiving the updating data; and transmitting, in the update process, the acquisition request at a transmission time different from an updated access time, which is a time represented by the updated access time information, by the particular time.

3. The image forming apparatus according to claim 1, wherein, if the updating data acquired in the update process includes time update data indicating update of the access time represented by the access time information with an updated time different from the access time by a particular time, the controller transmits the acquisition request at the updated time when performing the update process next time.

4. The image forming apparatus according to claim 1, wherein, if the updating data acquired in the update process includes time update data indicating update of the access time represented by the access time information with an updated time different from the access time by a particular time, the controller updates the access time information, such that the access time information represents the updated time, to transmit the acquisition request at the updated time when performing the update process next time.

5. The image forming apparatus according to claim 1, wherein the controller determines the particular time used by the image forming apparatus based on a random number.

6. The image forming apparatus according to claim 5, wherein a plurality of the multiple image forming apparatuses are connected to the file server, and wherein the controller of each of the plurality of the multiple forming applauses determines the particular time based on a random number.

7. The image forming apparatus according to claim 1, wherein the controller performs:

creating, in the file server, a log file to which identification information of the image forming apparatus is attached; and when the content of the setting data is updated by the data of the updating data, recording an update log about the updated content in the log file.

8. The image fanning apparatus according to claim 1 configured to form the image in accordance with an electrophotographic image forming method.

9. An image forming apparatus comprising:

an image forming unit configured to form an image on a recording medium;

a storage configured to store setting data;

a network connector configured to connect to a file server, which stores updating data used to update a content of the setting data, through a network; and a controller configured to control the image forming unit based on the content of the setting data, wherein the setting data contains access time information about an access time when the image forming apparatus is to access the updating data stored in the file server, wherein the controller is configured to perform an update process including:

transmitting, through the network connector, an acquisition request for the updating data to the file server based on the access time indicated by the access time information;

acquiring, through the network connector, the updating data transmitted from the file server in response to the acquisition request, and updating the content of the setting data based on the updating data, wherein, in the update process, the controller transmits the acquisition request to the file server at a time different from the access time represented by the access time information by a particular time, wherein the updating data acquired in the update process is configured to include time update data indicating update of the access time represented by the access time information with an updated time different from the access time, wherein the controller is configured to perform:

a time update process of updating the access time information included in the setting data based on the time update data when receiving the updating data; and transmitting, in the update process, the acquisition request at a transmission time different from an updated access time, which is a time represented by the updated access time information, by the particular time, and wherein, in the update process, the controller is configured to perform:

a determining process of determining the transmission time different from the updated access time by the particular time; and transmitting, in the update process, the acquisition request at the transmission time determined in the determining process.

10. The image forming apparatus according to claim 9,
wherein, in the time update process, the controller is configured to store, in the storage, the transmission time determined by the determining process, and
wherein, in the update process, the controller is configured to transmit the acquisition request at the transmission time stored in the storage.

11. An image forming apparatus comprising:
an image forming unit configured to form an image on a recording medium;
a storage configured to store setting data;
a network connector configured to connect to a file server, which stores updating data used to update a content of the setting data, through a network; and
a controller configured to control the image forming unit based on the content of the setting data,
wherein the setting data contains access time information about an access time when the image forming apparatus is to access the updating data stored in the file server,
wherein the controller is configured to perform an update process including:
  transmitting, through the network connector, an acquisition request for the updating data to the file server based on the access time indicated by the access time information;
  acquiring, through the network connector, the updating data transmitted from the file server in response to the acquisition request, and
  updating the content of the setting data based on the updating data,
wherein, in the update process, the controller transmits the acquisition request to the file server at a time different from the access time represented by the access time information by a particular time,
wherein the controller performs:
  creating, in the file server, a log file to which identification information of the image forming apparatus is attached;
  when the content of the setting data is updated by the data of the updating data, recording an update log about the updated content in the log file;
  acquiring a list of the log files stored in the file server, the log files being created by multiple image forming apparatuses including the image forming apparatus and at least one other image forming apparatus; and
  determining the particular time based on an order of the image forming apparatus in the list according to the identification information.

12. The image forming apparatus according to claim 11,
wherein, in the list of the log files, the multiple image forming apparatuses are listed in an order of identification numbers of the multiple image forming apparatuses, and
wherein the controller determines the particular time by multiplying the order by a constant time.

13. A setting file management system comprising:
a file server configured to store updating data used to update a content of setting data; and
an image forming apparatus comprising:
  an image forming unit configured to form an image on a recording medium;
  a storage configured to store the setting data;
  a network connector configured to connect to the file server through a network; and
  a controller configured to control the image forming unit based on the content of the setting data,
wherein the setting data contains access time information indicating an access time when the image forming apparatus is to access the updating data stored in the file server,
wherein the image forming apparatus transmits, through the network connector, an acquisition request for the updating data to the file server at a time based on the access time indicated by the access time information contained in the setting data,
wherein the file server transmits, to the image forming apparatus, the update file in response to the acquisition request, and
wherein the image forming apparatus performs:
  updating the access time by data of the updating data received from the file server;
  determining the time when the acquisition request is to be transmitted based on the access time information, without requiring user operation to the image forming apparatus, such that the time is different from the access time represented by the access time information by a particular time; and
  transmitting the acquisition request to the file server at the determined time.

* * * * *

UNITED STATES PATENT AND TRADEMARK OFFICE
CERTIFICATE OF CORRECTION

| | | |
|---|---|---|
| PATENT NO. | : 11,556,086 B2 | Page 1 of 1 |
| APPLICATION NO. | : 17/190775 | |
| DATED | : January 17, 2023 | |
| INVENTOR(S) | : Satoshi Tanimoto | |

It is certified that error appears in the above-identified patent and that said Letters Patent is hereby corrected as shown below:

In the Claims

Claim 7, Column 14, Lines 12-13:
Please change: "when the content of the setting data is updated by the data of the updating data, recording an update log" to -- when the content of the setting data is updated by the updating data, recording an update log --

Claim 11, Column 15, Lines 39-40:
Please change: "when the content of the setting data is updated by the data of the updating data, recording an update log" to -- when the content of the setting data is updated by the updating data, recording an update log --

Claim 13, Column 16, Line 32:
Please change: "apparatus, the update file in response to the acquisition" to -- apparatus, the updating data in response to the acquisition --

Claim 13, Column 16, Line 35:
Please change: "updating the access time by data of the updating data" to -- updating the access time by the updating data --

Signed and Sealed this
Third Day of October, 2023

Katherine Kelly Vidal
*Director of the United States Patent and Trademark Office*